United States Patent
Ono et al.

(10) Patent No.: US 10,933,847 B2
(45) Date of Patent: Mar. 2, 2021

(54) VEHICLE BODY BEHAVIOR CONTROL DEVICE AND METHOD OF CONTROLLING BEHAVIOR OF VEHICLE BODY

(71) Applicant: Robert Bosch GmbH, Stuttgart (DE)

(72) Inventors: Shunsaku Ono, Kanagawa (JP); Yuki Oshida, Kanagawa (JP)

(73) Assignee: Robert Bosch GmbH, Stuttgart (DE)

(*) Notice: Subject to any disclaimer, the term of this patent is extended or adjusted under 35 U.S.C. 154(b) by 310 days.

(21) Appl. No.: 15/735,680

(22) PCT Filed: Jun. 1, 2016

(86) PCT No.: PCT/IB2016/053221
§ 371 (c)(1),
(2) Date: Dec. 12, 2017

(87) PCT Pub. No.: WO2017/013503
PCT Pub. Date: Jan. 26, 2017

(65) Prior Publication Data
US 2018/0362003 A1 Dec. 20, 2018

(30) Foreign Application Priority Data

Jun. 16, 2015 (JP) .............................. JP2015-120767

(51) Int. Cl.
*B60T 8/00* (2006.01)
*B60T 8/17* (2006.01)
*B60T 8/1755* (2006.01)
*B60T 8/1766* (2006.01)
*B62L 3/02* (2006.01)
(Continued)

(52) U.S. Cl.
CPC .......... *B60T 8/1706* (2013.01); *B60T 8/1755* (2013.01); *B60T 8/1766* (2013.01); *B62L 3/02* (2013.01);
(Continued)

(58) Field of Classification Search
CPC .... B60T 8/1706; B60T 8/1766; B60T 8/1755; B60T 2240/06; B60T 2270/304;
(Continued)

(56) References Cited

U.S. PATENT DOCUMENTS

| 6,183,048 | B1* | 2/2001 | Takahira | B60T 7/122 |
| | | | | 303/113.1 |
| 6,377,885 | B2* | 4/2002 | Yasui | B60T 8/172 |
| | | | | 303/150 |
| 2012/0049617 | A1* | 3/2012 | Furuyama | B60T 13/662 |
| | | | | 303/9.75 |

FOREIGN PATENT DOCUMENTS

| CN | 103384621 A | 11/2013 |
| DE | 10319663 | 11/2004 |

(Continued)

OTHER PUBLICATIONS

Machine translation of DE102011079134A1 (Year: 2013).*
(Continued)

*Primary Examiner* — Ian Jen
(74) *Attorney, Agent, or Firm* — Michael Best & Friedrich LLP

(57) ABSTRACT

Provided is a vehicle body behavior control device and a method of controlling behavior of a vehicle body which can reduce unstable behavior of the vehicle body. A vehicle body behavior control device incorporated into a vehicle body having a plurality of wheels includes: a brake mechanism which controls behavior of the wheels; and a control part which controls an interlocking brake operation in which a braking force is applied to the plurality of wheels using the brake mechanism when an operation for applying braking to any one of the wheels is performed based on a gradient value θ of a road surface on which the vehicle body travels.

13 Claims, 6 Drawing Sheets

(51) Int. Cl.
  *B62L 3/04*     (2006.01)
  *B60T 8/1761*   (2006.01)
  *B60T 8/32*     (2006.01)
  *B60T 8/58*     (2006.01)

(52) U.S. Cl.
  CPC ............ *B62L 3/04* (2013.01); *B60T 8/17616* (2013.01); *B60T 8/3225* (2013.01); *B60T 8/58* (2013.01); *B60T 2210/20* (2013.01); *B60T 2240/02* (2013.01); *B60T 2240/06* (2013.01); *B60T 2250/04* (2013.01); *B60T 2270/10* (2013.01); *B60T 2270/304* (2013.01)

(58) Field of Classification Search
  CPC ............ B60T 2270/10; B60T 2250/04; B60T 2240/02; B60T 2210/20; B60T 8/58; B60T 8/3225; B60T 8/17616; B62L 3/04; B62L 3/02
  See application file for complete search history.

(56) References Cited

FOREIGN PATENT DOCUMENTS

| | | | |
|---|---|---|---|
| DE | 102008026531 | 2/2009 | |
| DE | 102011079134 | 1/2013 | |
| DE | 102011079134 A1 * | 1/2013 | ............ B60T 7/042 |
| EP | 1388475 | 2/2004 | |
| JP | 2000071963 | 3/2000 | |
| JP | 2002264784 A | 9/2002 | |
| JP | 2004042890 A | 2/2004 | |
| JP | 2005349876 A | 12/2005 | |
| JP | 2015089699 A | 5/2015 | |

OTHER PUBLICATIONS

International Search Report for Application No. PCT/IB2016/053221 dated Aug. 12, 2016 (English Translation, 3 pages).

* cited by examiner

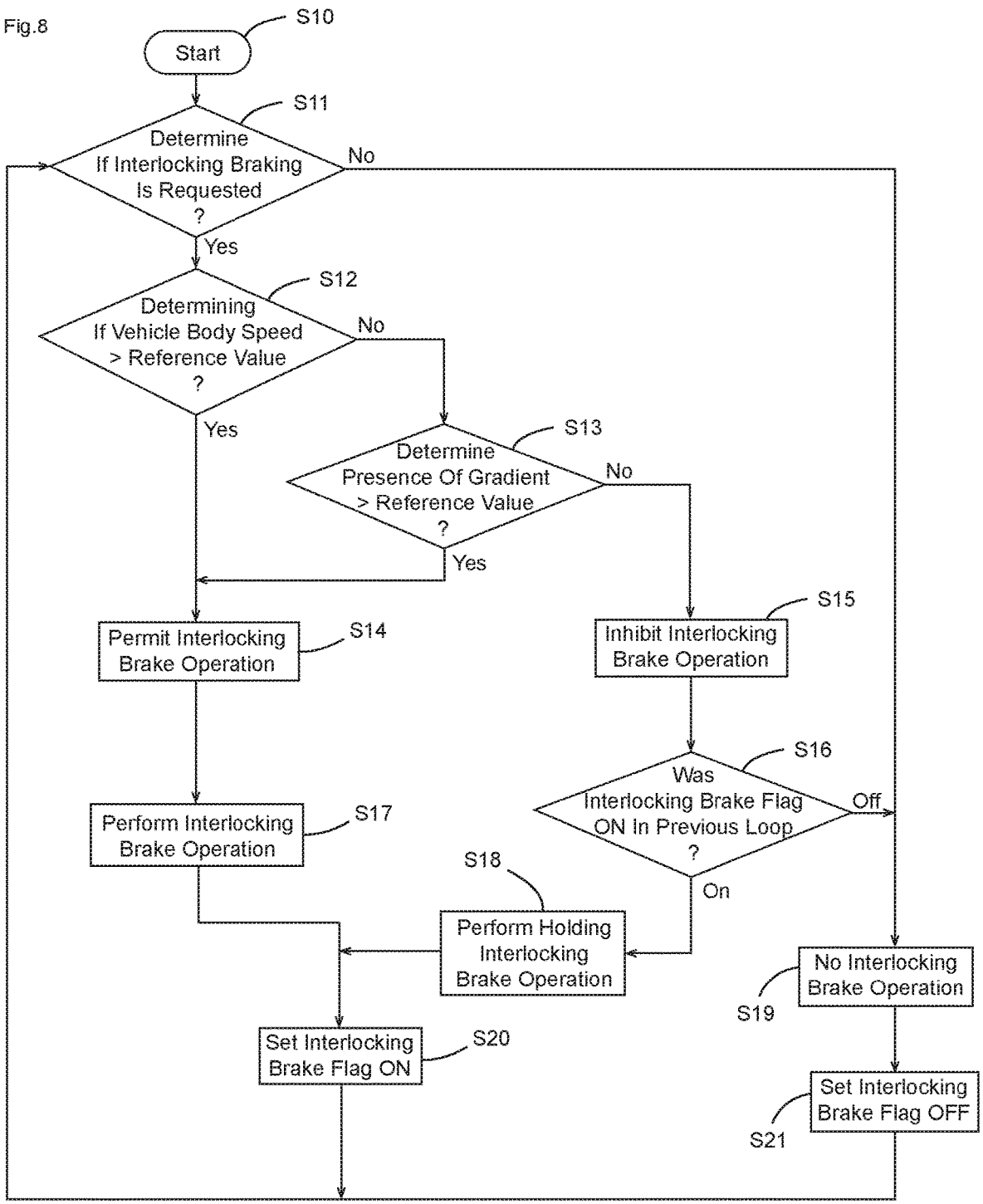

VEHICLE BODY BEHAVIOR CONTROL DEVICE AND METHOD OF CONTROLLING BEHAVIOR OF VEHICLE BODY

BACKGROUND OF THE INVENTION

The present invention relates to a vehicle body behavior control device and a method of controlling behavior of a vehicle body.

In a vehicle such as a motorcycle (two-wheeled vehicle or three-wheeled vehicle), a vehicle body behavior control device which controls behavior of a vehicle body is incorporated. For example, the vehicle body behavior control device controls an interlocking brake operation based on deceleration of the vehicle body (see JP-A-2000-71963).

SUMMARY OF THE INVENTION

In the conventional vehicle body behavior control device, even in a case where a condition of a road surface on which the vehicle body travels changes or the like, an interlocking brake operation is controlled based on deceleration of the vehicle body. Accordingly, for example, there may be a case where a braking force applied to each wheel becomes excessively large or small so that behavior of the vehicle body becomes unstable.

The present invention has been made in view of the above-mentioned drawback, and it is an object of the present invention to provide a vehicle body behavior control device and a method of controlling behavior of a vehicle body which can reduce unstable behavior of the vehicle body.

According to the present invention, a vehicle body behavior control device is a vehicle body behavior control device which is incorporated into a vehicle body having a plurality of wheels, wherein the vehicle body behavior control device includes: a brake mechanism which controls behavior of the wheels; and a control part which controls an interlocking brake operation in which a braking force is applied to the plurality of wheels using the brake mechanism when an operation for applying braking to any one of the wheels is performed based on a gradient value of a road surface on which the vehicle body travels.

According to the present invention, a method of controlling behavior of a vehicle body is a method of controlling behavior of a vehicle body which includes a plurality of wheels, wherein when an operation for applying braking any one of the wheels is performed, an interlocking brake operation in which a braking force is applied to the plurality of wheels using a brake mechanism which controls behavior of the wheels is controlled based on a gradient value of a road surface on which the vehicle body travels.

According to the vehicle body behavior control device and the method of controlling behavior of a vehicle body of the present invention, an interlocking brake operation is performed by also taking into account the gradient value of the road surface and hence, it is possible to reduce an excessively large or small braking force applied to each wheel so that behavior of the vehicle body can be made stable.

BRIEF DESCRIPTION OF THE DRAWINGS

FIG. 8 is a view showing one example of the flow of an interlocking brake operation performed by the vehicle body behavior control device according to the first embodiment of the present invention at the time of stopping an operation of the motorcycle.

DETAILED DESCRIPTION

Hereinafter, a vehicle body behavior control device and a method of controlling behavior of a vehicle body according to the present invention are explained with reference to drawings.

Although the explanation will be made by taking a case as an example where the vehicle body behavior control device and the method of controlling behavior of a vehicle body according to the present invention are applied to a motorcycle, the vehicle body behavior control device and the method of controlling behavior of a vehicle body according to the present invention may be applied to other vehicles respectively having a plurality of brake operation systems. For example, the vehicle body behavior control device and the method of controlling behavior of a vehicle body according to the present invention may be applied to a bicycle (including an electrically operated bicycle and a battery assisted bicycle) or the like.

Further, the constitutions, the operations and the like explained hereinafter form one example of the present invention, and the vehicle body behavior control device and the method of controlling behavior of a vehicle body according to the present invention are not limited to such constitutions, operations and the like.

Further, in the respective drawings, the illustration of detailed portions is simplified or omitted when necessary.

First Embodiment

<Overall Constitution of Hydraulic Control System 100>

Figure 1:
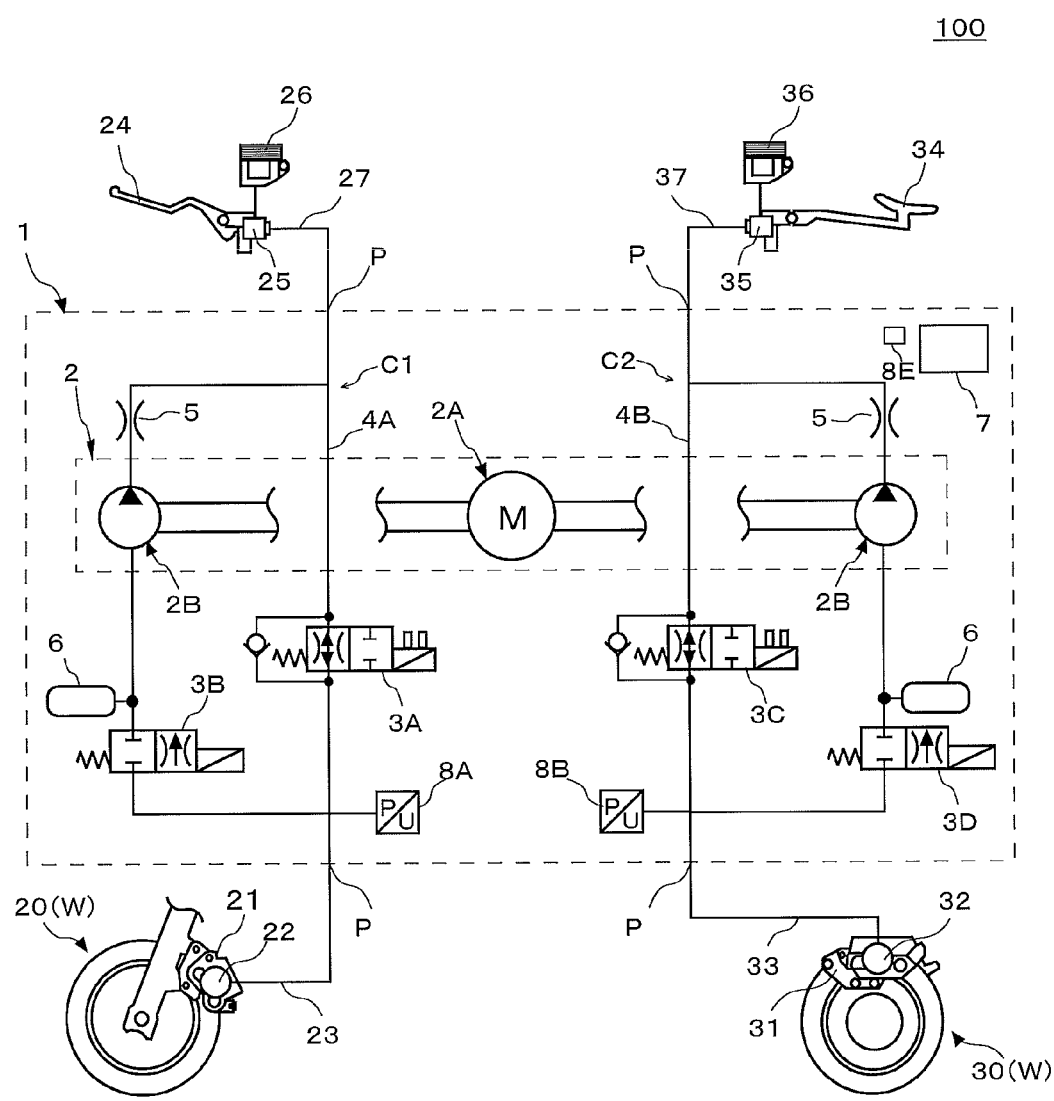
FIG. 1 is a schematic constitutional view of a hydraulic control system including a vehicle body behavior control device according to a first embodiment of the present invention.

FIG. 1 is a schematic constitutional view of a hydraulic control system 100 including a vehicle body behavior control device 1 according to a first embodiment of the present invention.

The hydraulic control system 100 is mounted on a motorcycle, and includes the vehicle body behavior control device 1 which controls behavior of a vehicle body.

The motorcycle has a vehicle body which includes a front wheel 20 and a rear wheel 30 (hereinafter also simply referred to as wheels W). An axle of the front wheel 20 and an axle of the rear wheel 30 are rotatably fixed to the vehicle body.

The motorcycle includes a handle lever 24 and a foot pedal 34 which a user or the like operates. A braking force applied to the front wheel 20 changes when the handle lever 24 is operated, and a braking force applied to the rear wheel 30 changes when the foot pedal 34 is operated. The handle lever 24 is operated by a rider's hand and the foot pedal 34 is operated by a rider's foot.

The hydraulic control system 100 includes a front wheel hydraulic circuit C1 through which a brake fluid used for generating a braking force applied to the front wheel 20 flows, and a rear wheel hydraulic circuit C2 through which a brake fluid used for generating a braking force applied to the rear wheel 30 flows.

The hydraulic control system 100 includes: a front brake pad 21 attached to the front wheel 20; a front wheel cylinder 22 in which a front brake piston (not shown in the drawing) which moves the front brake pad 21 is slidably disposed; and a brake fluid pipe 23 connected to the front wheel cylinder 22.

The hydraulic control system 100 includes: a first master cylinder 25 attached to the handle lever 24; a first reservoir 26 in which a brake fluid is stored; and a brake fluid pipe 27 connected to the first master cylinder 25. A master cylinder piston (not shown in the drawing) is slidably disposed in the first master cylinder 25. When the handle lever 24 is operated, the master cylinder piston in the first master cylinder 25 moves.

The hydraulic control system 100 includes: a rear brake pad 31 attached to the rear wheel 30; a rear wheel cylinder 32 in which a rear brake piston (not shown in the drawing) which moves the rear brake pad 31 is slidably disposed; and a brake fluid pipe 33 connected to the rear wheel cylinder 32.

The hydraulic control system 100 includes: a second master cylinder 35 attached to the foot pedal 34; a second reservoir 36 in which a brake fluid is stored; and a brake fluid pipe 37 connected to the second master cylinder 35. A master cylinder piston (not shown in the drawing) is slidably disposed in the second master cylinder 35. When the foot pedal 34 is operated, the master cylinder piston in the second master cylinder 35 moves.

<Constitutions of Respective Parts of Vehicle Body Behavior Control Device 1>

The vehicle body behavior control device 1 includes: an internal flow passage 4 through which a brake fluid flows; a pump device 2 used for transferring a brake fluid in the internal flow passage 4 toward a first master cylinder 25 side and a second master cylinder 35 side; and openable and closable regulating valves 3 mounted in the front wheel hydraulic circuit C1 and the rear wheel hydraulic circuit C2. The regulating valve 3 includes a first pressure boosting valve 3A and a first pressure reducing valve 3B, and a second pressure boosting valve 3C and a second pressure reducing valve 3D. The regulating valve 3 is an electromagnetic valve equipped with a solenoid, for example.

Here, the brake mechanism which the vehicle body behavior control device of the present invention controls corresponds to the regulating valves 3, the pump devices 2 and the like, and a fluid pressure in the internal flow passage 4 is controlled by the mechanism so that behavior of the vehicle body is controlled.

The vehicle body behavior control device 1 includes a control part 7 for controlling opening/closing of the regulating valves 3, a rotational speed of the pump device 2 or the like. A part or the whole of the control part 7 may be formed of a microcomputer, a micro processing unit or the like, for example. A part or the whole of the control part 7 may be also formed of a unit which can be updated such as a firmware. Further, a part or the whole of the control part 7 may be a program module or the like which is executed in accordance with an instruction from a CPU or the like.

The vehicle body behavior control device 1 includes a detection part 8 which outputs detection signals to the control part 7. The detection part 8 includes a first pressure sensor 8A and a second pressure sensor 8B mounted in the internal flow passage 4, a front wheel speed sensor 8C and a rear wheel speed sensor 8D used for calculating acceleration of the vehicle body (see FIG. 5); and an acceleration sensor 8E mounted on the vehicle body.

The vehicle body behavior control device 1 includes various kinds of ports P respectively connected to the brake fluid pipes 23, 27, 33, 37. The vehicle body behavior control device 1 includes flow restrictors 5 which restrict flow rates of brake fluids flowing through the internal flow passages 4; and accumulators 6 which can store a brake fluid therein.

In the explanation made hereinafter, a front wheel speed and a rear wheel speed may be also collectively referred to as a wheel speed, and the front wheel speed sensor 8C and the rear wheel speed sensor 8D may be also collectively referred to as a wheel speed sensor WS.

The internal flow passage 4 includes a first internal flow passage 4A which forms a part of the front wheel hydraulic circuit C1, and a second internal flow passage 4B which forms a part of the rear wheel hydraulic circuit C2.

The first pressure boosting valve 3A, the first pressure reducing valve 3B, the first pressure sensor 8A and the like are mounted in the first internal flow passage 4A. The first internal flow passage 4A is connected to the brake fluid pipe 23 and the brake fluid pipe 27 through the port P. The second pressure booster valve 3C, the second pressure reducing valve 3D, the second pressure sensor 8B and the like are mounted in the second internal flow passage 4B. The second internal flow passage 4B is connected to the brake fluid pipe 33 and the brake fluid pipe 37 through the port P.

The pump device 2 includes; for example, a drive mechanism 2A which can be formed of a DC motor or the like; and two pump elements 2B to which a drive force is given by the drive mechanism 2A. The drive mechanism 2A includes a stator, a rotor and the like, and a rotational speed of the drive mechanism 2A is controlled by the control part 7. One pump element 2B is used for transferring a brake fluid in the front wheel hydraulic circuit C1 and is mounted in the first internal flow passage 4A. The other pump element 2B is used for transferring a brake fluid in the rear wheel hydraulic circuit C2 and is mounted in the second internal flow passage 4B.

The control part 7 performs an interlocking brake operation for a vehicle body behavior control.

The interlocking brake operation is an operation for applying a braking force to both the front wheel 20 and the rear wheel 30 when an operation for applying a braking force to the front wheel 20 is performed by the handle lever 24 or when an operation for applying a braking force to the rear wheel 30 is performed by the foot pedal 34.

That is, the control part 7 performs, when the wheel W which forms a part of a plurality of wheels W connected to different operation systems is subject to braking in response to an operation by a user or the like in the operation system, an interlocking brake operation for applying a braking force to the wheel W and another wheel W connected to the operation system different from the above-mentioned operation system.

In this case, the control part 7 controls the interlocking brake operation based on a gradient value $\theta$ of a road surface. To be more specific, the control part 7 performs the interlocking brake operation by controlling opening/closing of the regulating valve 3 which constitutes a brake mechanism, a rotational speed of the pump device 2 or the like.

The control part 7 may perform the interlocking brake operation using the gradient value $\theta$ of a road surface or may perform the interlocking brake operation using other physical amount which can be converted into the gradient value $\theta$ of a road surface.

<Axle Load Applied to Front Wheel 20 and Axle Load Applied to Rear Wheel 30>

Figure 2:
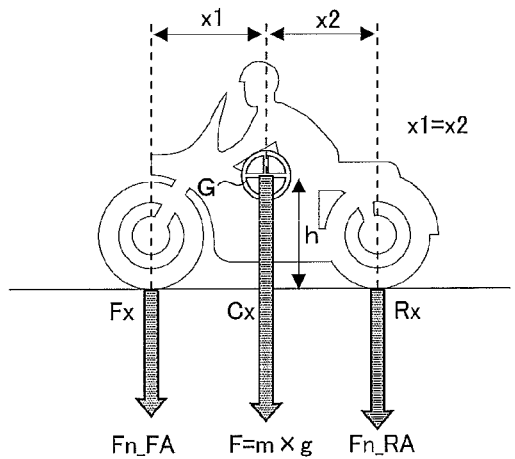
FIG. 2 is a view for explaining an axle load applied to a front wheel and an axle load applied to a rear wheel in a motorcycle which travels on a level ground.

FIG. 2 is a view for explaining an axle load applied to the front wheel 20 and an axle load applied to the rear wheel 30 in a motorcycle which travels on a level ground.

A mass m is a mass of the motorcycle. The center of gravity G is the center of gravity of the motorcycle. A height h is a height from a road surface to the center of gravity G. A position Cx is a position of the center of gravity G in a horizontal direction. A position Fx is a position of an axle of the front wheel 20 in a horizontal direction. A position Rx is a position of an axle of the rear wheel 30 in a horizontal direction. A load F is a load of the motorcycle which acts on the center of gravity G. A load Fn_FA is an axle load applied to the front wheel 20. A load Fn_RA is an axle load applied to the rear wheel 30. A component (mass, the center of gravity or the like) of a person riding on the motorcycle may be taken into account in setting the load Fn_FA and the load Fn_RA.

A length x1 is a length between the position Cx and the position Fx. A length x2 is a length between the position Cx and the position Rx.

For the sake of convenience of explanation, assume that the motorcycle is designed such that a relationship (x1=x2) is established on a flat road surface. Firstly, a case is considered where the motorcycle is on a flat road surface as shown in FIG. 2.

Assuming gravitational acceleration as g, a load F expressed by m×g is applied to the motorcycle in a downward direction. The load F is divided into a component applied to the axle of the front wheel 20 and a component applied to the axle of the rear wheel 30. The load Fn_FA applied to the axle of the front wheel 20 and the load Fn_RA applied to the axle of the rear wheel 30 are expressed by the following formulae (1) and (2).

[Formula 1]

$$Fn\_FA=[1-\{x1/(x1+x2)\}]\times m\times g=m\times g/2 \quad (1)$$

[Formula 2]

$$Fn\_RA=[1-\{x2/(x1+x2)\}]\times m\times g=m\times g/2 \quad (2)$$

That is, on the flat road surface, the magnitude of the load Fn_FA and the magnitude of the load Fn_RA are equal.

Figure 3:
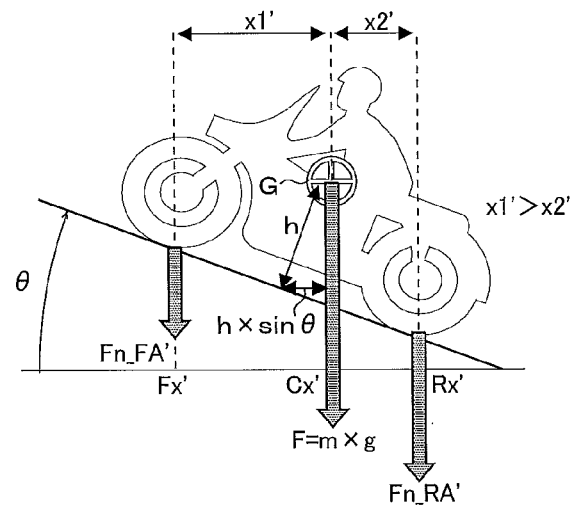
FIG. 3 is a view for explaining an axle load applied to the front wheel and an axle load applied to the rear wheel in the motorcycle which travels on a road surface having an uphill gradient.

FIG. 3 is a view for explaining an axle load applied to the front wheel 20 and an axle load applied to the rear wheel 30 in the motorcycle which travels on a road surface having an uphill gradient. Next, a case is considered where the motorcycle is on the road surface having an uphill gradient as shown in FIG. 3.

A gradient value $\theta$ of the road surface is an angle with reference to a horizontal plane, wherein a gradient value takes a positive value when a road surface has an uphill gradient and a gradient value takes a negative value when a road surface has a downhill gradient. A height h is a height of the center of gravity G in a direction orthogonal to the road surface having an uphill gradient. A position Cx' is a position of the center of gravity G in a horizontal direction. A position Fx' is a position of the axle of the front wheel 20 in a horizontal direction. A position Rx' is a position of the axle of the rear wheel 30 in the horizontal direction. A load Fn_FA' is an axle load applied to the front wheel 20. A load Fn_RA' is an axle load applied to the rear wheel 30.

A length x1' is a length between the position Cx' and the position Fx'. A length x2' is a length between the position Cx' and the position Rx'. The length x1' and the length x2' can be calculated as follows.

[Formula 3]

$$x1'=x1\times\cos\theta+h\times\sin\theta \quad (3)$$

[Formula 4]

$$x2'=x2\times\cos\theta-h\times\sin\theta \quad (4)$$

Accordingly, a load Fn_FA' applied to the axle of the front wheel 20 and a load Fn_RA' applied to the axle of the rear wheel 30 are expressed by the following formulae (5) and (6).

[Formula 5]

$$Fn\_FA'=[1-\{x1'/(x1'+x2')\}]\times m\times g=[1-\{(x1\times\cos\theta+h\times\sin\theta)/((x1\times x2)\times\cos\theta)\}]\times m\times g \quad (5)$$

[Formula 6]

$$Fn\_RA'=[1-\{x2'/(x1'+x2')\}]\times m\times g=[1-\{(x2\times\cos\theta-h\times\sin\theta)/((x1+x2)\times\cos\theta)\}]\times m\times g \quad (6)$$

That is, when a relationship (x1=x2) is established, on a road surface having an uphill gradient, the load Fn_RA' becomes larger than the load Fn_FA'. Further, the larger a gradient value $\theta$ of a road surface (that is, the larger a value of an uphill gradient), the load Fn_RA' is increased and the load Fn_FA' is decreased.

Figure 4:
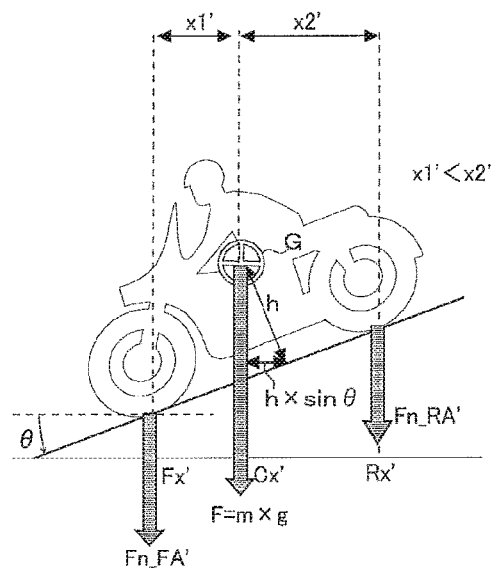
FIG. 4 is a view for explaining an axle load applied to the front wheel and an axle load applied to the rear wheel in the motorcycle which travels on a road surface having a downhill gradient.

FIG. 4 is a view for explaining an axle load applied to the front wheel 20 and an axle load applied to the rear wheel 30 in the motorcycle which travels on a road surface having a downhill gradient. The axle load applied to the front wheel 20 and the axle load applied to the rear wheel 30 in the motorcycle which travels on the road surface having a downhill gradient can be also calculated in a manner substantially equal to the manner explained with reference to FIG. 3.

That is, when a relationship (x1=x2) is established, on a road surface having an downhill gradient, the load Fn_FA' becomes larger than the load Fn_RA'. Further, the smaller a gradient value $\theta$ of a road surface (that is, the larger a value of a downhill gradient), the load Fn_FA' is increased and the load Fn_RA' is decreased.

By applying a larger braking force to the wheel W having the larger axle load than the wheel W having the small axle load, behavior of the vehicle body can be made stable. Further, as described previously, an axle load applied to each wheel W changes corresponding to a gradient value $\theta$ of a road surface. Accordingly, with the acquisition of a gradient value θ of a road surface on which the motorcycle travels, a ratio of a braking force distributed to the respective wheels W can be suitably changed thus making behavior of the vehicle body stable.

<Constitutional Example of Control Part 7>

Figure 5:
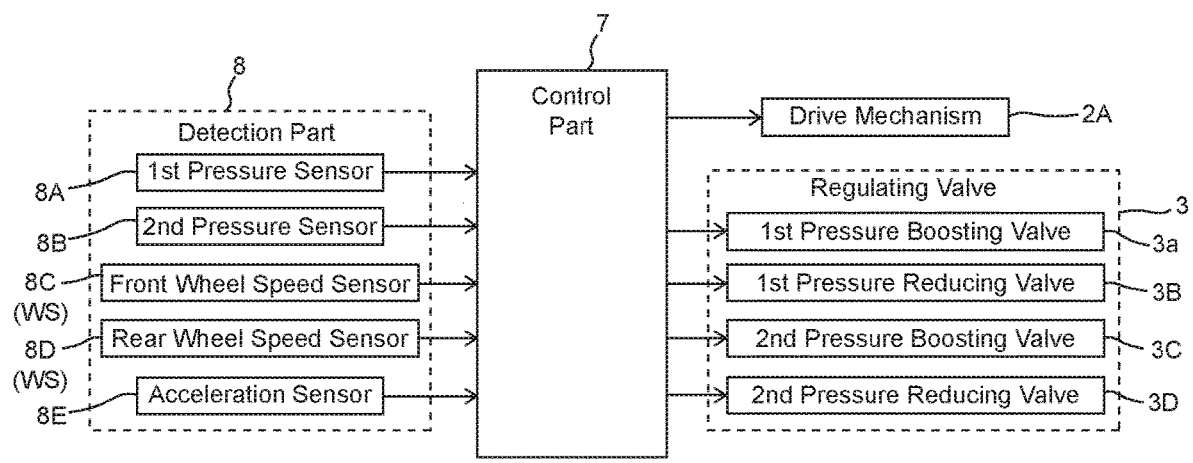
FIG. 5 is a functional block diagram of various sensors, a control part and various actuators which the hydraulic control system having the vehicle body behavior control device according to the first embodiment of the present invention includes.
Figure 6:
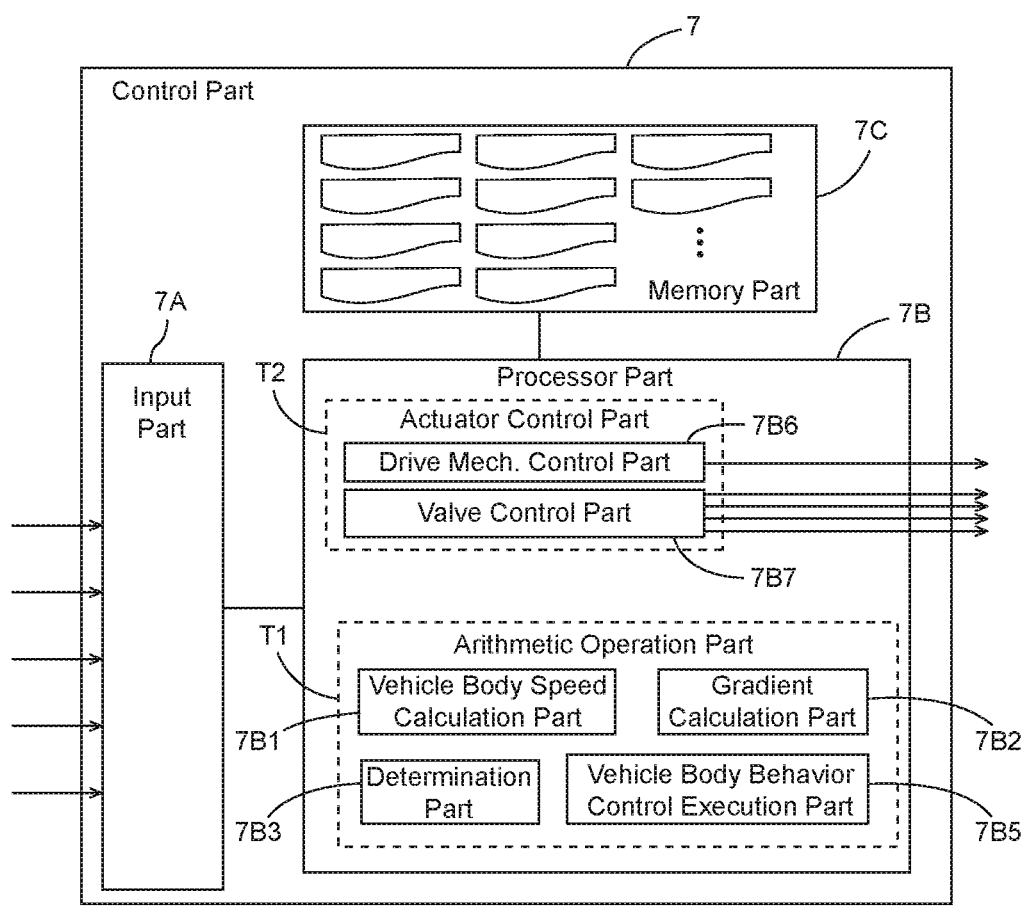
FIG. 6 is a functional block diagram of the control part included in the vehicle body behavior control device according to the first embodiment of the present invention.

FIG. 5 is a functional block diagram of various sensors, the control part 7 and various actuators which the hydraulic control system 100 having the vehicle body behavior control device 1 according to the first embodiment includes. FIG. 6 is a functional block diagram of the control part 7 included in the vehicle body behavior control device 1 according to the first embodiment. The constitutional example of the control part 7 is explained with reference to FIG. 5 and FIG. 6.

The control part 7 includes: an input part 7A which receives a signal from the detection part 8; a processor part 7B which calculates a gradient value θ of a road surface on which the vehicle body travels based on a signal from the detection part 8 and performs a control of opening/closing of the regulating valve 3, a rotational speed of the pump device 2 or the like; and a memory part 7C in which various data such as a calculated gradient value θ of a road surface and the like are stored.

(Input Part 7A)

The input part 7A is formed of circuits including an input circuit which receives a signal from the detection part 8 and the like, for example. A signal which the input part 7A receives is outputted to the processor part 7B.

(Processor Part 7B)

The processor part 7B includes an arithmetic operation part T1 and an actuator control part T2. The arithmetic operation part T1 includes a vehicle body speed calculation part 7B1, a gradient calculation part 7B2, a determination part 7B3, and a vehicle body behavior control execution part 7B5. The processor part 7B may be formed of a microcontroller or the like, for example.

The vehicle body speed calculation part 7B1 calculates a vehicle body speed vVeh based on a detection signal from the wheel speed sensor WS.

The gradient calculation part 7B2 calculates a gradient value θ of a road surface based on a detection signal from the acceleration sensor 8E and a detection signal from the wheel speed sensor WS. Here, an example of a method of calculating a gradient value θ of a road surface according to the first embodiment is explained.

An acceleration component aX in an advancing direction of the vehicle body acquired from a detection signal from the acceleration sensor 8E is regarded as a sum of an acceleration component aVeh attributed to acceleration/deceleration in the advancing direction of the vehicle body and an acceleration component aSlope attributed to a gradient value θ of a road surface. Accordingly, the control part 7 can estimate the acceleration component aSlope attributed to the gradient value θ of the road surface by performing the calculation of a formula (7). The acceleration component aVeh attributed to acceleration/deceleration can be obtained as a differential value of a wheel speed. For example, the control part 7 calculates a wheel speed based on a detection signal from the wheel speed sensor WS, and sets a calculated differential value of the wheel speed as the acceleration component aVeh attributed to acceleration/deceleration. The acceleration component aSlope attributed to a gradient value θ of a road surface takes a positive value when the motorcycle travels on a road surface having an uphill gradient, and takes a negative value when the motorcycle travels on a road surface having a downhill gradient.

[Formula 7]

$$a\text{Slope} = aX - a\text{Veh} \quad (7)$$

Then, the control part 7 can acquire a gradient value θ of a road surface by calculating a formula (8) using the acceleration component aSlope attributed to the gradient value θ of the road surface. The gradient value θ of the road surface takes a positive value when the motorcycle travels on a road surface having an uphill gradient, and takes a negative value when the motorcycle travels on a road surface having a downhill gradient.

[Formula 8]

$$\theta = \arcsin(a\text{Slope}/g) \quad (8)$$

In this manner, the gradient calculation part 7B2 can calculate a gradient value θ of a road surface on which the motorcycle is traveling based on a detection signal from the acceleration sensor 8E and a detection signal from the wheel speed sensor WS.

The method of calculating a gradient value θ of a road surface performed by the control part 7 is not limited to the above-mentioned method. For example, the vehicle body behavior control device 1 may include a gradient sensor additionally besides the acceleration sensor 8E, and the control part 7 may acquire a gradient value θ of a road surface from a detection signal from the gradient sensor. In such a case, a load of the control part 7 can be reduced by an amount that the above-mentioned calculation of the gradient calculation part 7B2 becomes unnecessary.

Further, for example, the control part 7 may acquire information on a gradient value θ of a road surface on which the motorcycle is traveling based on GPS information. Also in such a case, a load of the control part 7 can be reduced by an amount that the above-mentioned calculation of the gradient calculation part 7B2 becomes unnecessary.

The determination part 7B3 determines whether a road surface on which the motorcycle is traveling has an uphill gradient, a downhill gradient or is flat based on a gradient value θ of a road surface calculated by the gradient calculation part 7B2. The determination part 7B3 also determines whether or not a gradient value θ of a road surface calculated by the gradient calculation part 7B2 is equal to or above a reference value α. The determination part 7B3 also determines whether or not a request for execution of an interlocking brake operation exists. The determination part 7B3 also determines whether or not a vehicle body speed vVeh calculated by the vehicle body speed calculation part 7B1 is larger than a reference value vMin. The determination part 7B3 also sets a flag "interlocking brake ON" when there exists a request for execution of an interlocking brake operation and a predetermined condition is satisfied. Further, the determination part 7B3 determines whether or not an interlocking brake operation is to be performed based on whether or not the flag "interlocking brake ON" is set. These determinations of the determination part 7B3 are used in a braking force distribution flow and an interlocking brake operation flow at the time of performing a stop operation described later.

The vehicle body behavior control execution part 7B5 generates a control signal for performing an interlocking brake operation which constitutes a vehicle body behavior control based on a gradient value θ of a road surface calculated by the gradient calculation part 7B2, and outputs the control signal to the actuator control part T2.

Axle loads applied to the respective wheels W change corresponding to a gradient value θ of a road surface.

Accordingly, the vehicle body behavior control execution part 7B5 performs a braking force distribution flow described later so as to change a ratio of braking forces applied to the respective wheels W corresponding to the gradient value θ of the road surface thus reducing unstable behavior of the motorcycle.

Further, the vehicle body behavior control execution part 7B5 performs an interlocking brake operation flow described later based on a determination result of the determination part 7B3.

The actuator control part T2 includes a drive mechanism control part 7B6 and a valve control part 7B7.

At the time of performing an interlocking brake operation, the valve control part 7B7 controls an opening/closing operation of the regulating valve 3, and the drive mechanism control part 7B6 controls a rotational speed of the drive mechanism 2A cooperatively with the valve control part 7B7.

(Memory Part 7C)

In the memory part 7C, information on wheel speeds of the front wheel 20 and the rear wheel 30, information calculated by the processor part 7B, reference values and the like are stored. The memory part 7C may be formed of a RAM (Random Access Memory) or the like, for example.

<Braking Force Distribution in Interlocking Brake Operation>

Figure 7:
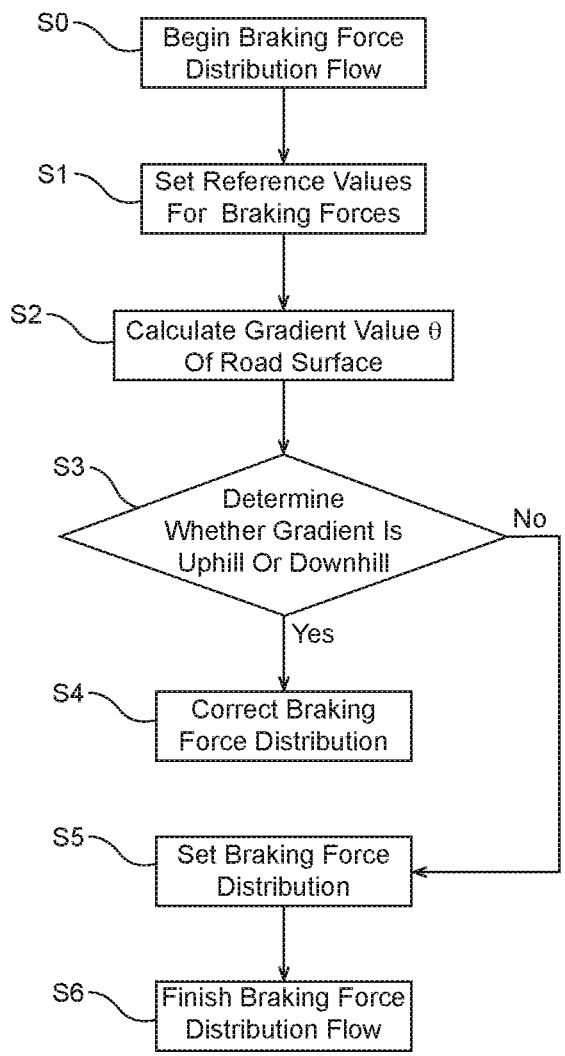
FIG. 7 is a view showing one example of the flow of braking force distribution of the front wheel and the rear wheel performed by the vehicle body behavior control device according to the first embodiment of the present invention.

FIG. 7 is a view showing one example of the flow of braking force distribution of the front wheel 20 and the rear wheel 30 executed by the vehicle body behavior control device 1 according to the first embodiment.

(Step S0: Start)

The control part 7 starts a braking force distribution flow.

(Step S1: Acquisition of Reference Values for Braking Forces)

The vehicle body behavior control execution part 7B5 of the control part 7 sets reference values for braking forces distributed to the front wheel 20 and the rear wheel 30 using a vehicle body speed vVeh calculated by the vehicle body speed calculation part 7B1, for example. The reference values for the braking forces distributed to the front wheel 20 and the rear wheel 30 may be constantly calculated or may be stored in the memory part 7C in advance.

(Step S2: Calculation of Gradient Value θ of Road Surface)

The gradient calculation part 7B2 of the control part 7 calculates a gradient value θ of a road surface on which the vehicle body is traveling based on a detection signal from the acceleration sensor 8E and a detection signal from the wheel speed sensor WS.

(Step S3: Determination Relating to Gradient of Road Surface)

The determination part 7B3 of the control part 7 determines whether or not a road surface has an uphill gradient or a downhill gradient or is flat based on a gradient value θ of a road surface calculated by the gradient calculation part 7B2.

When the road surface has an uphill gradient or a downhill gradient, processing advances to step S4.

When the road surface is flat, processing advances to step S5.

(Step S4: Correction of Braking Force Distribution)

The vehicle body behavior control execution part 7B5 of the control part 7 corrects numerical values of a braking force of the front wheel 20 and a braking force of the rear wheel 30 set in step S1 based on a gradient value θ of a road surface calculated by the gradient calculation part 7B2.

For example, when the road surface has an uphill gradient, the vehicle body behavior control execution part 7B5 increases a ratio of a braking force distributed to the rear wheel 30 compared to the ratio of the braking force distributed to the rear wheel 30 when the road surface does not have an uphill gradient. Further, the vehicle body behavior control execution part 7B5 performs a control such that the larger a gradient of a road surface having an uphill gradient (the larger a gradient value θ of the road surface), the larger a ratio of a braking force distributed to the rear wheel 30 becomes.

When the road surface has a downhill gradient, the vehicle body behavior control execution part 7B5 increases a ratio of a braking force distributed to the front wheel 20 compared to the ratio of the braking force distributed to the front wheel 20 when the road surface does not have a downhill gradient. Further, the vehicle body behavior control execution part 7B5 performs a control such that the larger a gradient of a road surface having a downhill gradient (the smaller a gradient value θ of the road surface), the larger a ratio of a braking force distributed to the front wheel 20 becomes.

In increasing a ratio of a braking force distributed to the front wheel 20, the vehicle body behavior control execution part 7B5 may execute a control such that a ratio of a braking force distributed to the front wheel 20 is increased without lowering a braking force applied to the rear wheel 30.

(Step S5: Setting Braking Force Distribution)

When the processing is subject to only step S3, the control part 7 uses reference values for braking forces applied to the front wheel 20 and the rear wheel 30 which are set in step S1 as set values for braking force distribution.

On the other hand, when the processing is subject to step S3 and step S4, the control part 7 uses numerical values of braking forces for the front wheel 20 and the rear wheel 30 corrected in step S4 as set values for braking force distribution.

(Step S6: End)

The control part 7 finishes the braking force distribution flow.

<Interlocking Brake Operation when Operation of Motorcycle is Stopped>

FIG. 8 is a view showing one example of the flow of an interlocking brake operation executed by the vehicle body behavior control device 1 according to the first embodiment at the time of stopping an operation of the motorcycle. A control executed in performing the interlocking brake operation at the time of stopping an operation of the motorcycle is explained with reference to FIG. 8.

(Step S10: Start)

The control part 7 starts the interlocking brake operation flow.

(Step S11: Determination Relating to Request for Interlocking Brake Operation)

The determination part 7B3 of the control part 7 determines the presence/non-presence of a request for an interlocking brake operation.

When the request for an interlocking brake operation is present, the processing advances to step S12.

When the request for an interlocking brake operation is not present, the processing advances to step S19.

The control part 7 may determine whether or not a request for an interlocking brake operation is present by calculating slip ratios of the respective wheels W based on a vehicle body speed vVeh and a wheel speed, for example. The control part 7 may determine whether or not the request for the interlocking brake operation is present based on other methods.

(Step S12: Determination of Vehicle Body Speed)

The determination part 7B3 of the control part 7 determines whether or not a vehicle body speed vVeh calculated by the vehicle body speed calculation part 7B1 is larger than a reference value vMin.

When the vehicle body speed vVeh is larger than the reference value vMin, the processing advances to step S14.

When the vehicle body speed vVeh is equal to or below the reference value vMin, the processing advances to step S13.

(Step S13: Determination on Presence/Non-Presence of Gradient)

The determination part 7B3 of the control part 7 determines whether or not an absolute value of a gradient value θ of a road surface calculated by the gradient calculation part 7B2 is equal to or above a reference value α. That is, the determination part 7B3 determines whether or not the road surface has a gradient equal to or above the reference value α. A reference value α for a road surface having an uphill gradient and a reference value α for a road surface having a downhill gradient may differ from each other. A reference value α may be set such that the larger a mass m of the motorcycle, the smaller the reference value α to be set becomes. A component of a person who rides on the motorcycle may be taken into account in setting the mass m. Further, a reference value α may be set by a user or the like.

When it is determined that the absolute value of the gradient value θ is equal to or above the reference value α, the processing advances to step S14.

When it is determined that the absolute value of the gradient value θ is smaller than the reference value α, the processing advances to step S15.

(Step S14: Permission of Interlocking Brake Operation for Increasing Braking Force Applied to Rear Wheel 30)

The vehicle body behavior control execution part 7B5 of the control part 7 sets a permission flag which permits an interlocking brake operation for increasing a braking force applied to the rear wheel 30, that is, an interlocking brake operation for increasing a braking force applied to the rear wheel 30 when an operation for applying braking to the front wheel 20 by the handle lever 24 is performed.

That is, the control part 7 permits an interlocking brake operation for increasing a braking force applied to the rear wheel 30 even in the case where a vehicle body speed vVeh is low compared to a reference value vMin and a road surface has a gradient.

(Step S15: Inhibition of Interlocking Brake Operation for Increasing Braking Force Applied to Rear Wheel 30)

The vehicle body behavior control execution part 7B5 of the control part 7 sets an inhibition flag which inhibits an interlocking brake operation for increasing a braking force applied to the rear wheel 30, that is, an interlocking brake operation for increasing a braking force applied to the rear wheel 30 when an operation for applying braking to the front wheel 20 by the handle lever 24 is performed.

That is, the control part 7 inhibits an interlocking brake operation for increasing a braking force applied to the rear wheel 30 in the case where a vehicle body speed vVeh is low compared to a reference value vMin and a road surface has no gradient.

(Step S16: Determination of Interlocking Brake Flag in Preceding-Time Loop)

The determination part 7B3 of the control part 7 determines whether a flag "interlocking brake ON" or a flag "interlocking brake OFF" is set in a preceding-time loop.

When the flag "interlocking brake ON" is set in the preceding-time loop, the processing advances to step S18.

When the flag "interlocking brake OFF" is set in the preceding-time loop, the processing advances to step S19.

(Step S17: Execution of Interlocking Brake Operation for Increasing Braking Force Applied to Rear Wheel 30)

The vehicle body behavior control execution part 7B5 of the control part 7, since a permission flag is set in step S14, sets predetermined values of braking forces applied to the front wheel 20 and the rear wheel 30, and outputs the predetermined values to the actuator control part T2. At this stage of operation, in the braking force distribution flow, the vehicle body behavior control execution part 7B5 preferably performs a control such that the larger a gradient value θ of a road surface, the larger a ratio of a braking force distributed to the rear wheel 30 becomes.

Here, when it is determined that a vehicle body speed vVeh is larger than a reference value vMin in step S12, an interlocking brake operation for increasing a braking force applied to the rear wheel 30 is performed. This interlocking brake operation is performed mainly for suppressing lift-off of the vehicle body. Further, when it is determined that an absolute value of a gradient value θ of a road surface is equal to or above a reference value a in step S13, an interlocking brake operation for increasing a braking force applied to the rear wheel 30 is performed. This interlocking brake operation is mainly performed for allowing a user or the like to take his foot off the foot pedal 34 while suppressing lift-off of the vehicle body.

(Step S18: Execution of Interlocking Brake Operation for Holding Pressure)

The vehicle body behavior control execution part 7B5 of the control part 7, since an inhibition flag is set in step S15, does not perform an interlocking brake operation for increasing a braking force applied to the rear wheel 30. On the other hand, the vehicle body behavior control execution part 7B5 performs an interlocking brake operation for holding a pressure of the rear wheel cylinder 32 and a pressure of the front wheel cylinder 22.

(Step S19: Non-Execution of Pressure Control)

The vehicle body behavior control execution part 7B5 of the control part 7 does not allow the execution of a pressure control by the actuator control part T2. That is, a braking force of the wheel W is directly operated by a user or the like.

(Step S20: Flag "Interlocking Brake ON")

The determination part 7B3 of the control part 7 sets the flag "interlocking brake ON".

(Step S21: Flag "Interlocking Brake OFF")

The determination part 7B3 of the control part 7 sets the flag "interlocking brake OFF".

In the Nth (N being a natural number) loop, when the processing is subject to step S17 or step S18 and thereafter an interlocking brake operation is performed, a flag "interlocking brake ON" is set. Then, in the (N+1)th loop, when there is a request for an interlocking brake operation, an interlocking brake operation is performed succeedingly.

In the Nth loop, when the processing finishes step S19, a flag "interlocking brake OFF" is set. Then, even in the case where there is a request for an interlocking brake operation in the (N+1)th loop, when a vehicle body speed vVeh is equal to or below a reference value vMin and a road surface does not have a gradient equal to or above a reference value α, an interlocking brake operation is not performed.

When a vehicle body speed vVeh is larger than a reference value vMin and when a vehile body speed vVeh is equal to or below the reference value vMin and a road surface has a gradient equal to or above a reference value α, an interlocking brake operation for increasing a braking force applied to the rear wheel 30 is performed.

Further, when a vehile speed vVeh is equal to or below a reference value vMin and a gradient of a road surface does not have a gradient that exceeds a reference value α, an interlocking brake operation for holding a pressure is performed only when an interlocking brake operation is performed in a preceding-time loop.

<Advantageous Effects Acquired by Vehicle Body Behavior Control Device 1 According to the First Embodiment>

The vehicle body behavior control device 1 of the first embodiment includes: the brake mechanism which controls behavior of the wheels W; and the control part 7 which controls an interlocking brake operation based on a gradient value θ of a road surface when an operation for applying braking to any one of wheels W using the brake mechanism is performed. With such a configuration, even when axle loads applied to the respective wheels W change depending on a gradient of a road surface so that proper braking forces to be applied to the respective wheels W in the interlocking brake operation change, the control part 7 applies braking forces to the wheels W based on the gradient value θ of the road surface thus reducing unstable behavior of the vehicle body.

Preferably, the control part 7 of the vehicle body behavior control device 1 according to the first embodiment changes a ratio of braking forces distributed to the plurality of wheels W respectively in the interlocking brake operation based on the gradient value θ of the road surface.

For example, the control part 7 of the vehicle body behavior control device 1 according to the first embodiment increases a ratio of a braking force distributed to the rear wheel 30 in a state where a road surface has an uphill gradient by comparing such a ratio of a braking force with a ratio of a braking force distributed to the rear wheel 30 in a state where the road surface has no uphill gradient. The motorcycle which travels on a road surface having an uphill gradient exhibits a larger axle load applied to the rear wheel 30 than the case where the motorcycle travels on a level ground or a road surface having a downhill gradient. With such a configuration, when the control part 7 determines that the road surface has an uphill gradient, the control part 7 increases a ratio of a braking force distributed to the rear wheel 30 thus reducing unstable behavior of the motorcycle which travels on the road surface having an uphill gradient.

For example, the control part 7 of the vehicle body behavior control device 1 according to the first embodiment performs a control where the larger a gradient of a road surface (the larger a gradient value θ of the road surface), the larger a ratio of a braking force distributed to the rear wheel 30 becomes in a state where the road surface has an uphill gradient. The larger a gradient of a road surface having an uphill gradient, the larger an axle load applied to the rear wheel 30 becomes. By taking into account such a phenomenon, a braking force applied to the rear wheel 30 is further increased thus further surely reducing unstable behavior of the motorcycle.

For example, the control part 7 of the vehicle body behavior control device 1 according to the first embodiment increases a ratio of a braking force distributed to the front wheel 20 in a state where a road surface has a downhill gradient by comparing such a ratio of a braking force with a ratio of a braking force distributed to the front wheel 20 in a state where the road surface has no downhill gradient. The motorcycle which travels on a road surface having a downhill gradient exhibits a larger axle load applied to the front wheel 20 than the case where the motorcycle travels on a level ground or a road surface having an uphill gradient. With such a configuration, when the control part 7 determines that the road surface has a downhill gradient, the control part 7 increases a ratio of a braking force distributed to the front wheel 20 thus reducing unstable behavior of the motorcycle which travels on the road surface having a downhill gradient.

For example, the control part 7 of the vehicle body behavior control device 1 according to the first embodiment performs a control where the larger a gradient of a road surface (the smaller a gradient value θ of the road surface), the larger a ratio of a braking force distributed to the front wheel 20 becomes in a state where the road surface has a downhill gradient. The larger a gradient of a road surface having a downhill gradient, the larger an axle load applied to the front wheel 20 becomes. By taking into account such a phenomenon, a braking force applied to the front wheel 20 is further increased thus further surely reducing unstable behavior of the motorcycle.

For example, the control part 7 of the vehicle body behavior control device 1 according to the first embodiment increases a ratio of a braking force distributed to the front wheel 20 without lowering a braking force applied to the rear wheel 30 in a state where a road surface has a downhill gradient. When the motorcycle travels on a road surface having a downhill gradient, its own weight of the motorcycle acts so as to increase a speed of the motorcycle and hence, a sum of required braking forces becomes large compared to the case where the motorcycle travels on a road surface having an uphill gradient or a flat road surface. Accordingly, in an interlocking brake operation performed when a road surface has a downhill gradient, the control part 7 increases a ratio of a braking force distributed to the front wheel 20 without lowering a braking force applied to the rear wheel 30 thus suppressing the occurrence of shortage of the braking force.

Preferably, the control part 7 of the vehicle body behavior control device 1 according to the first embodiment determines whether or not an interlocking brake operation is to be performed based on a gradient value θ of a road surface.

For example, the control part 7 of the vehicle body behavior control device 1 according to the first embodiment performs an interlocking brake operation for increasing a braking force applied to the rear wheel 30 when an operation for applying braking to the front wheel 20 using the handle lever 24 is performed in a state where a vehicle body speed vVeh is low compared to a reference value vMin and a road surface has a gradient at the time of performing a motorcycle stopping operation. The state where a road surface has a gradient includes both a state where the road surface has an uphill gradient and a state where the road surface has a downhill gradient.

With such a control, even in a state immediately before stoppage of the motorcycle where a vehicle body speed vVeh of the motorcycle which is traveling on a road surface having a gradient is low compared to a reference value vMin, lift-off of the vehicle body is suppressed and a user or the like can take his foot off the foot pedal 34. Then, the user or the like can stop the vehicle body against a gradient of the road surface by applying a braking force to the wheel W to an extent that the vehicle body does not slop down while putting his both legs on the road surface. Further, when such a control is executed in a state where the road surface has a downhill gradient, a lift-off suppression effect can be further increased.

When an interlocking brake operation is performed in a state where the motorcycle is traveling on a level ground at a low speed, the motorcycle is decelerated more than necessity, a user or the like has feeling of discomfort. Accordingly, when the motorcycle travels on a level ground at a low speed, an interlocking brake operation for increasing a braking force applied to the rear wheel 30 may not be performed when an operation of applying braking to the front wheel 20 using the handle lever 24 is performed.

REFERENCE SIGNS LIST

1: vehicle body behavior control device
2: pump device
2A: drive mechanism
2B: pump element
3: regulating valve
3A: first pressure boosting valve
3B: first pressure reducing valve
3C: second pressure boosting valve
3D: second pressure reducing valve
4: internal flow passage
4A: first internal flow passage
4B: second internal flow passage
5: flow restrictor
6: accumulator
7: control part
7A: input part
7B: processor part
7B1: vehicle body speed calculation part
7B2: gradient calculation part
7B3: determination part
7B5: vehicle body behavior control execution part
7B6: drive mechanism control part
7B7: valve control part
7C: memory part
8: detection part
8A: first pressure sensor
8B: second pressure sensor
8C: front wheel speed sensor
8D: rear wheel speed sensor
8E: acceleration sensor
20: front wheel
21: front brake pad
22: front wheel cylinder
23: brake fluid pipe
24: handle lever
25: first master cylinder
26: first reservoir
27: brake fluid pipe
30: rear wheel
31: rear brake pad
32: rear wheel cylinder
33: brake fluid pipe
34: foot pedal
35: second master cylinder
36: second reservoir
37: brake fluid pipe
100: hydraulic control system
C1: front wheel hydraulic circuit
C2: rear wheel hydraulic circuit
G: center of gravity
P: port
T1: arithmetic operation part
T2: actuator control part
W: wheel
WS: wheel speed sensor

The invention claimed is:

1. A vehicle body behavior control device configured to be incorporated into a vehicle body including two or three wheels, the vehicle body behavior control device comprising:
a brake mechanism which is configured to control behavior of the wheels; and
a control part which is configured to control an interlocking brake operation in which a braking force is applied to the two or three wheels using the brake mechanism when an operation for applying braking to any one of the wheels is performed based on a gradient value of a road surface on which the vehicle body travels,
wherein the control part determines whether or not the interlocking brake operation is to be performed based on the gradient value of the road surface.

2. The vehicle body behavior control device according to claim 1, wherein the control part is configured to change a ratio of braking forces distributed to the two or three wheels respectively in the interlocking brake operation based on the gradient value of the road surface on which the vehicle body travels forward.

3. The vehicle body behavior control device according to claim 2, wherein the control part is configured to increase a ratio of the braking force distributed to a rear wheel in a state where the road surface has an uphill gradient by comparing such a ratio of the braking force with a ratio of the braking force distributed to the rear wheel in a state where the road surface has no uphill gradient.

4. The vehicle body behavior control device according to claim 2, wherein the control part is configured to execute a control where the larger a gradient value of the road surface, the larger a ratio of the braking force distributed to a rear wheel becomes in a state where the road surface has an uphill gradient.

5. The vehicle body behavior control device according to claim 2, wherein the control part is configured to increase a ratio of the braking force distributed to a front wheel in a state where the road surface has a downhill gradient by comparing such a ratio of the braking force with a ratio of the braking force distributed to the front wheel in a state where the road surface has no downhill gradient.

6. The vehicle body behavior control device according to claim 2, wherein the control part is configured to execute a control where the larger a gradient value of the road surface, the larger a ratio of the braking force distributed to a front wheel becomes in a state where the road surface has a downhill gradient.

7. The vehicle body behavior control device according to claim 5, wherein the control part is configured to increase a ratio of the braking force distributed to the front wheel without lowering the braking force applied to a rear wheel in a state where the road surface has a downhill gradient.

8. The vehicle body behavior control device according to claim 1, wherein the vehicle body includes: a handle lever for applying the braking force to a front wheel; and a foot pedal for applying the braking force to a rear wheel,
wherein the control part performs the interlocking brake operation for increasing the braking force applied to the rear wheel when an operation for applying braking to the front wheel using the handle lever is performed in a state where a speed of the vehicle body is low compared to a reference speed and the road surface has a gradient.

9. A method of controlling behavior of a vehicle body which includes two or three wheels, the method comprising when an operation for applying braking to any one of the wheels is performed, controlling an interlocking brake operation in which a braking force is applied to the two or three wheels using a brake mechanism which controls behavior of the wheels based on a gradient value of a road surface on which the vehicle body travels,
wherein it is determined whether or not the interlocking brake operation is to be performed based on the gradient value of the road surface.

10. A vehicle comprising a vehicle body including two or three wheels, and a vehicle body behavior control device incorporated into the vehicle body, the vehicle body behavior control device comprising:
a brake mechanism which is configured to control behavior of the wheels; and
a control part which is configured to control an interlocking brake operation in which a braking force is applied to the two or three wheels using the brake mechanism when an operation for applying braking to any one of the wheels is performed based on a gradient value of a road surface on which the vehicle body travel,
wherein the control part determines whether or not the interlocking brake operation is to be performed based on the gradient value of the road surface.

11. The vehicle according to claim 10, wherein the vehicle body includes: a handle lever for applying the braking force to a front wheel; and a foot pedal for applying the braking force to a rear wheel, the control part performs the interlocking brake operation for increasing the braking force applied to the rear wheel when an operation for applying braking to the front wheel using the handle lever is performed in a state where a speed of the vehicle body is low compared to a reference speed and the road surface has a gradient.

12. The vehicle according to claim 10, wherein the vehicle is a two wheeled motorcycle traveling forward on the road surface.

13. The vehicle body behavior control device according to claim 1, wherein the vehicle is a two wheeled motorcycle traveling forward on the road surface.

* * * * *